United States Patent
Cline et al.

(10) Patent No.: US 10,533,765 B2
(45) Date of Patent: Jan. 14, 2020

(54) CHILLER PLANT

(71) Applicant: TRANE INTERNATIONAL INC., Davidson, NC (US)

(72) Inventors: Lee R. Cline, West Salem, WI (US); John A. Murphy, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 53 days.

(21) Appl. No.: 15/749,614

(22) PCT Filed: Aug. 4, 2016

(86) PCT No.: PCT/US2016/045552
§ 371 (c)(1),
(2) Date: Feb. 1, 2018

(87) PCT Pub. No.: WO2017/024133
PCT Pub. Date: Feb. 9, 2017

(65) Prior Publication Data
US 2018/0224147 A1     Aug. 9, 2018

Related U.S. Application Data

(60) Provisional application No. 62/200,772, filed on Aug. 4, 2015.

(51) Int. Cl.
*F24F 11/37* (2018.01)
*F24F 3/044* (2006.01)
(Continued)

(52) U.S. Cl.
CPC ............ *F24F 11/37* (2018.01); *F24F 3/0442* (2013.01); *F24F 3/06* (2013.01); *F24F 11/30* (2018.01);
(Continued)

(58) Field of Classification Search
CPC .......... F24F 11/37; F24F 11/30; F24F 3/0442; F24F 3/06; F24F 11/00; F24F 2110/10; F25B 25/005; F25B 49/02; F25B 41/003; F25B 2400/06; F25B 2700/21171; F25B 2339/047; F25B 2400/07; F25B 2600/2501; F25B 2400/0409; F25B 2400/061; F25B 2700/21152; Y02B 30/767
See application file for complete search history.

(56) References Cited

U.S. PATENT DOCUMENTS 5,097,670 A    3/1992   Yoshikawa et al.
5,316,384 A    5/1994   Corso
(Continued)

OTHER PUBLICATIONS

Extended European Search Report; European Patent Application No. 16833872.1, dated Mar. 19, 2019 (6 pages).
(Continued)

*Primary Examiner* — Emmanuel E Duke
(74) *Attorney, Agent, or Firm* — Hamre, Schumann, Mueller & Larson, P.C.

(57) ABSTRACT

A chiller plant including at least two chillers operating at different temperatures are disclosed. Process fluid circuits of the chillers can form fluid communication when, for example, one or more of the at least two chillers may fail, so that the other chiller(s) of the at least two chillers may provide backup operation to the failed chiller(s).

9 Claims, 6 Drawing Sheets

(51) Int. Cl.
*F24F 3/06* (2006.01)
*F24F 11/30* (2018.01)
*F25B 41/00* (2006.01)
*F25B 49/02* (2006.01)
*F24F 110/10* (2018.01)

(52) U.S. Cl.
CPC .......... *F25B 41/003* (2013.01); *F25B 49/02* (2013.01); *F24F 2110/10* (2018.01); *F25B 2400/0409* (2013.01); *F25B 2400/061* (2013.01); *F25B 2400/07* (2013.01); *F25B 2600/2501* (2013.01); *F25B 2700/21152* (2013.01)

(56) References Cited

U.S. PATENT DOCUMENTS

| | | |
|---|---|---|
| 5,479,783 A | 1/1996 | Uchida |
| 5,551,249 A | 9/1996 | Van Steenburgh, Jr. |
| 5,724,825 A | 3/1998 | Lee et al. |
| 5,946,926 A | 9/1999 | Hartman |
| 6,389,829 B2 | 5/2002 | Maehashi |
| 6,666,042 B1 | 12/2003 | Cline et al. |
| 6,718,779 B1 | 4/2004 | Henry |
| 8,505,324 B2 | 8/2013 | Goodfellow |
| 8,844,308 B2 | 9/2014 | Martin et al. |
| 2004/0000155 A1* | 1/2004 | Cline ............ F24F 3/065 62/175 |
| 2006/0010893 A1 | 1/2006 | Dominguez |
| 2009/0120117 A1* | 5/2009 | Martin ............ F25B 7/00 62/246 |
| 2009/0171512 A1 | 7/2009 | Duncan |
| 2009/0248174 A1 | 10/2009 | Taha et al. |
| 2013/0023171 A1 | 1/2013 | Brown et al. |
| 2013/0091891 A1 | 4/2013 | Hinde et al. |
| 2013/0125565 A1 | 5/2013 | Erpelding et al. |
| 2014/0216068 A1 | 8/2014 | Lee et al. |

OTHER PUBLICATIONS

International Search Report and Written Opinion, International Patent Application No. PCT/US2016/045552, dated Oct. 12, 2016 (9 pages).

* cited by examiner

CHILLER PLANT

FIELD

The disclosure herein relates to a chiller plant with two or more chillers. More specifically, systems of a chiller plant and methods of operating the same are disclosed.

BACKGROUND

A chiller generally is a machine to remove heat from a process fluid (e.g. water) via a refrigeration cycle (e.g. a vapor compression cycle). A chiller, for example, may be a part of a heating, ventilation and air conditioning (HVAC) system for a building. The chiller can be configured to cool the process fluid to a specific temperature setpoint(s) based on, for example, a primary function of the process fluid. In some situations, for example, the process fluid may be used to provide sensible cooling to a building or an enclosed space, for which the temperature of the process fluid may be in a range of, for example, about or at 57° F. to about or at 60° F. In some situations, for example, a chiller may be configured to provide a relatively cold process fluid (e.g. in a range of about or at 40° F. to about or at 45° F.) to an air-handling unit for dehumidification. Some chiller plants may include at least two chillers, each of which may be configured to obtain a desired temperature(s) of a process fluid. In some situations, the temperatures of the process fluid provided by different chillers may be different in the chiller plant with at least two chillers.

SUMMARY

A chiller plant including at least two chillers operating at different temperatures is disclosed. Corresponding process fluid circuits of the chillers may form fluid communication therebetween when, for example, one or more of the at least two chillers may be out of service (e.g. may have failed), so that the other chiller(s) of the operable chillers may provide backup operation to the failed chiller(s).

In some embodiments, the chiller plant may include a first chiller circuit including a first chiller and a first process fluid circuit, where the first chiller is configured to provide a first process fluid with a first temperature. The chiller plant also includes a second chiller circuit including a second chiller and a second process fluid circuit, where the second chiller is configured to provide a second process fluid with a second temperature. In some embodiments, the chiller plant may include one or more connecting lines configured to allow fluid communication to be formed between the first process fluid circuit and the second process fluid circuit.

In some embodiments, the one or more connecting lines may include a first connecting line configured to allow fluid communication to be formed between an upstream side of the first chiller in the first process fluid circuit and an upstream side of the second chiller in the second process fluid circuit, and a second connecting line configured to allow fluid communication to be formed between a downstream side of the first chiller in the first process fluid circuit and a downstream side of the second chiller in the second process fluid circuit.

In some embodiments, the first connecting line may include a first flow control device, and the second connecting line may include a second flow control device. One or both of the first and second flow control devices may be a valve.

In some embodiments, at least one of the first process fluid circuit and the second process fluid circuit may have a process fluid distribution line configured to allow fluid communication to be formed between the upstream side and the downstream side of the corresponding process fluid circuit.

In some embodiments, the process fluid distribution line may include a flow distribution control device, where the flow distribution control device is configured to control a fluid flow therein in response to a temperature reading. In some embodiments, the flow distribution control device may be a valve.

Other features and aspects of the systems, methods, and control concepts will become apparent by consideration of the following detailed description and accompanying drawings.

BRIEF DESCRIPTION OF THE DRAWINGS

Reference is now made to the drawings in which like reference numbers represent corresponding parts throughout.

FIG. 2A illustrates a normal operation mode. FIG. 2B illustrates an operation mode when the low temperature chiller is out of service. FIG. 2C illustrates an operation mode when the high temperature chiller is out of service.

DETAILED DESCRIPTION

Embodiments of a chiller plant as disclosed herein generally include at least two chillers, each of which may be operated at a different temperature. Process fluid circuits of the chillers may form fluid communication when one of the chillers may fail or be out of service. The chillers can generally operate independently in a normal operation mode. When one or more of the chillers fails or is shut down for service for example, the process fluid circuits of the chillers have a fluid communication so that the process fluid in one process fluid circuit can be directed to the other process fluid circuit. This allows the remaining operable chiller(s) to provide backup operation to the failed chiller(s).

References are made to the accompanying drawings that form a part hereof, and in which is shown by way of illustration various embodiments. It is to be understood that the terms used herein are for the purposes of describing the figures and embodiments and should not be regarded as limited in scope.

The Figures illustrate an example of a chiller plant with two chillers, however, it will be appreciated that the concepts described herein may be implemented in a chiller plant with more than two chillers with the appropriate fluid line connections.

Figure 1:
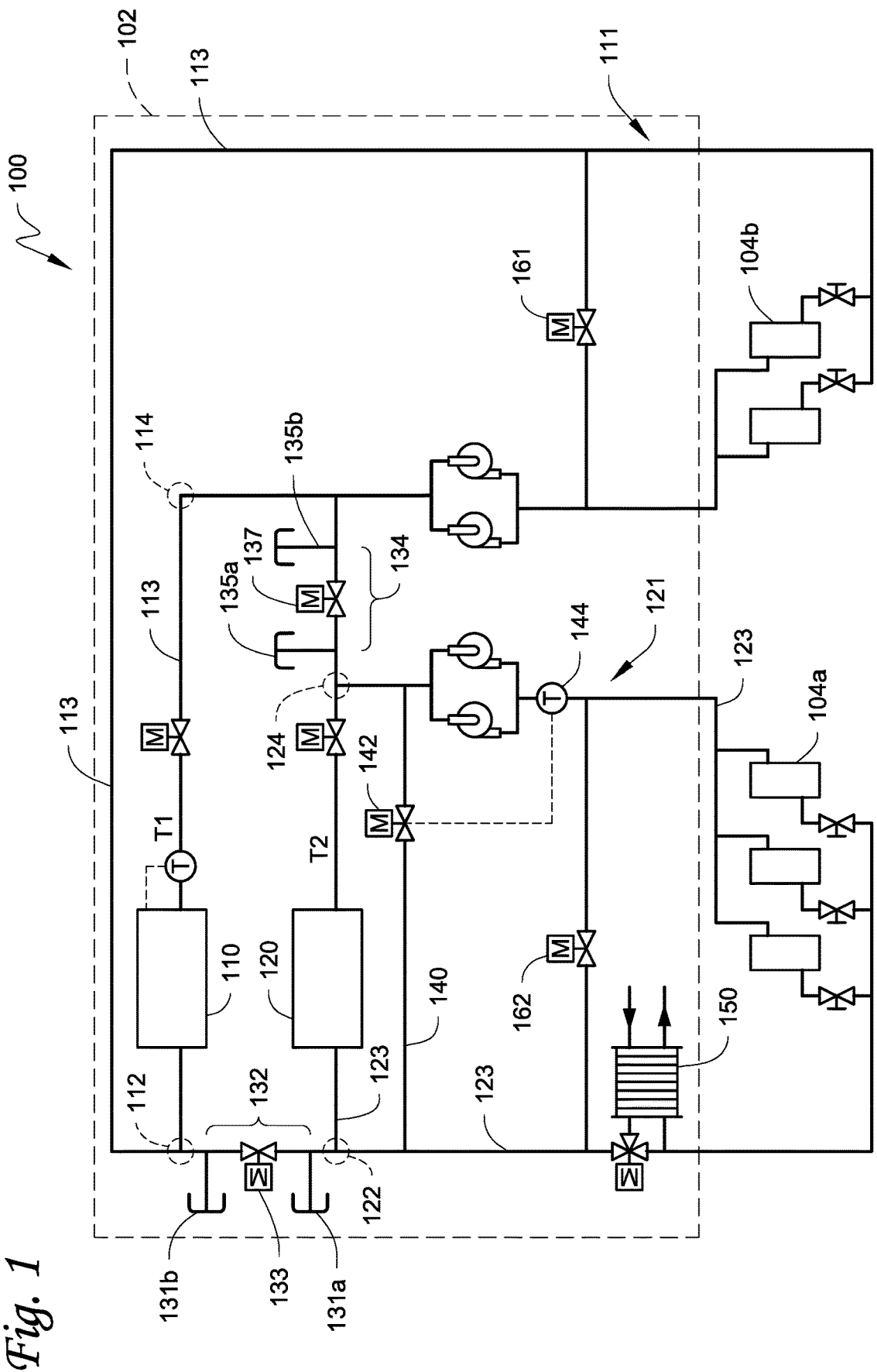
FIG. 1 illustrates a schematic diagram of a chiller plant include a higher temperature chiller and a lower temperature chiller.

FIG. 1 illustrates a schematic diagram of a HVAC system 100 that includes a chiller plant 102 and other components of the HVAC system 100, such as for example various terminal devices/systems, such as for example a variable air volume (VAV) terminal 104a and/or an air handling unit (AHU) 104b. It will also be appreciated that 104a may be any one or more of radiant cooling (e.g. panels or tubing embedded in a building structure), chilled beams (e.g. active or passive), and/or suitable fan powered terminals (fan-coils or variable airflow volume (VAV) terminals).

The chiller plant 102, in the illustrated embodiment, includes a first chiller 110 and a second chiller 120. The first chiller 110 may be configured to provide a first process fluid (e.g. water) at a first temperature T1, and the second chiller 120 may be configured to provide a second process fluid at a second temperature T2. For purposes of description only, in the illustrated embodiment, the first chiller 110 may be a lower temperature chiller and the second chiller 120 may be a higher temperature chiller. That is the temperature T1 may be lower than the temperature T2 in the illustrated embodiment.

The first chiller 110 and the second chiller 120 can form a first chiller circuit 111 and a second chiller circuit 121 with a first process fluid circuit 113 and a second process fluid circuit 123 respectively. The term "process fluid circuit" generally refers to a system or circuit including pipes, lines, pumps, valves that are configured to direct a process fluid conditioned by a chiller. The term "chiller circuit" generally refers to a process fluid circuit and a connected chiller. The first process fluid circuit 113 and the second process fluid circuit 123 may include, for example, valves and fluid flow lines that form fluid communication with the first chiller 110 and the second chiller 120 respectively, so that the first process fluid and the second process fluid can be directed in the corresponding process fluid circuits.

In the illustrated embodiment, the process fluid with different temperatures T1, T2 may be directed to other components or terminal devices and/or systems of the HVAC system 100 (e.g. the VAV terminal 104a or the AHU 104b) that serve different functions. In some embodiments, for example, the temperature T1 may be relatively cold and the first process fluid provided by the first chiller 110 may be directed to the AHU 104b in the first chiller circuit 111, and can be used to, for example, dehumidify an airflow in the AHU 104b. In some embodiments, the temperature T2 may be relatively high and the second process fluid provided by the second chiller 120 may be directed to the VAV terminal 104a in the second chiller circuit 121, and can be used to, for example, to provide sensible cooling to a building or an enclosed space. Other common examples of air-conditioning products that may be supplied with the relatively higher temperature second process fluid may include radiant cooling components (e.g. panels or tubing embedded in a building structure), chilled beams (active or passive), and/or suitable fan powered terminals (e.g. fan-coils or VAV terminals).

In the illustrated embodiment, an upstream side 112 of the first chiller 110 in the first process fluid circuit 113 can form fluid communication with an upstream side 122 of the second chiller 120 in the second process fluid circuit 123 via a first connecting line 132. A downstream side 114 of the first chiller 110 in the first process fluid circuit 113 can form fluid communication with a downstream side 124 of the second chiller 120 in the second process fluid circuit 123 via a second connecting line 134. It is noted that the upstream sides 112, 122 and the downstream sides 114, 124 are relative to the first and second chillers 110, 120 respectively in the first process fluid circuit 113 and the second process fluid circuit 123. The upstream side generally corresponds to the side where the process fluid is directed into the chiller in the corresponding process fluid circuit, and the downstream side generally corresponds to the side where the process fluid leaves the chiller the corresponding process fluid circuit.

In the illustrated embodiment, the first connecting line 132 includes a first flow control device 133 (e.g. a valve) optionally bracketed by stubs 131a, 131b. Similarly, the second connecting line 134 includes a second flow control device 137 (e.g. a valve) optionally bracketed by stubs 135a, 135b. The stubs 131a, 131b, 135a, and 135b are devices configured to receive, e.g., a process fluid from another source (e.g. a loaner chiller system (not shown in FIG. 1) when the first chiller 110 or the second chiller 120 may fail or be out of service). The stubs 131a, 131b, 135a, and 135b provide access points, from which a process fluid from another source may be introduced.

The upstream side 122 and the downstream side 124 of the second chiller 120 can also form fluid communication via a process fluid distribution line 140 that includes a flow distribution control device 142 (e.g. a valve) configured to control a fluid flow through the process fluid distribution line 140 in response to reading on a temperature sensor 144. The temperature sensor 144 is configured to measure a temperature of the process fluid at another location, such as on a fluid line directed to another component that uses the process fluid, such as for example a fluid line directed to the VAV terminal 104a. It is to be noted that the process fluid distribution line 140 and the flow distribution control device 142 may also form fluid communication between the upstream side 112 and the downstream side 114 of the first chiller 110. It will be appreciated that the first chiller 110 and first process fluid circuit 113 may be similarly equipped with a separate fluid distribution line 140 and flow distribution control device 142.

Relative to a flow direction in the second chiller circuit 121, the temperature sensor 144 is positioned downstream of the flow distribution line 140, but upstream of another component, e.g. the VAV terminal 104a. As discussed with respect to FIGS. 2A to 2C, the flow distribution control device 142 can control a fluid flow therethrough in response to the temperature sensor 144, so that a desired temperature can be maintained through the line 123 to the terminal devices/systems (e.g. VAV terminal 104a). It is to be understood that the temperature sensor 144 can also be suitably positioned at other locations in the second chiller circuit 121. For example, the temperature sensor 144 may be located at any position on the line of the second process fluid circuit 123, for example between the connection of fluid distribution line 140 with the line of second process circuit 123 and the VAV terminals 104a. For example, such location can include but is not limited to upstream of the pumps as shown, before the inlet to the coils of the VAV terminals 104a (or before other terminal devices which may be used on the circuit 123).

It is to be understood that the chiller plant 102 as illustrated is exemplary. The chiller plant 102 can include components that are known in the field, such as for example a waterside economizer 150 configured to take advantage of free cooling, and/or chiller minimum flow bypass valves 161, 162 for the first chiller 110 and the second chiller 120 respectively. The waterside economizer 150 can help heat exchange between a process fluid and the environment. It will be appreciated that the waterside economizer 150 and bypass valves 161, 162 are optional components in any chiller plant or system and may be configured appropriately themselves and within the fluid circuit(s) as desired and/or needed. The description below with respect to FIGS. 2B and 2C provide just one example and detail of their potential use, e.g. in a chiller, such as may be used for heat recovery or thermal storage (see e.g. FIGS. 3, 4).

Figure 2A:
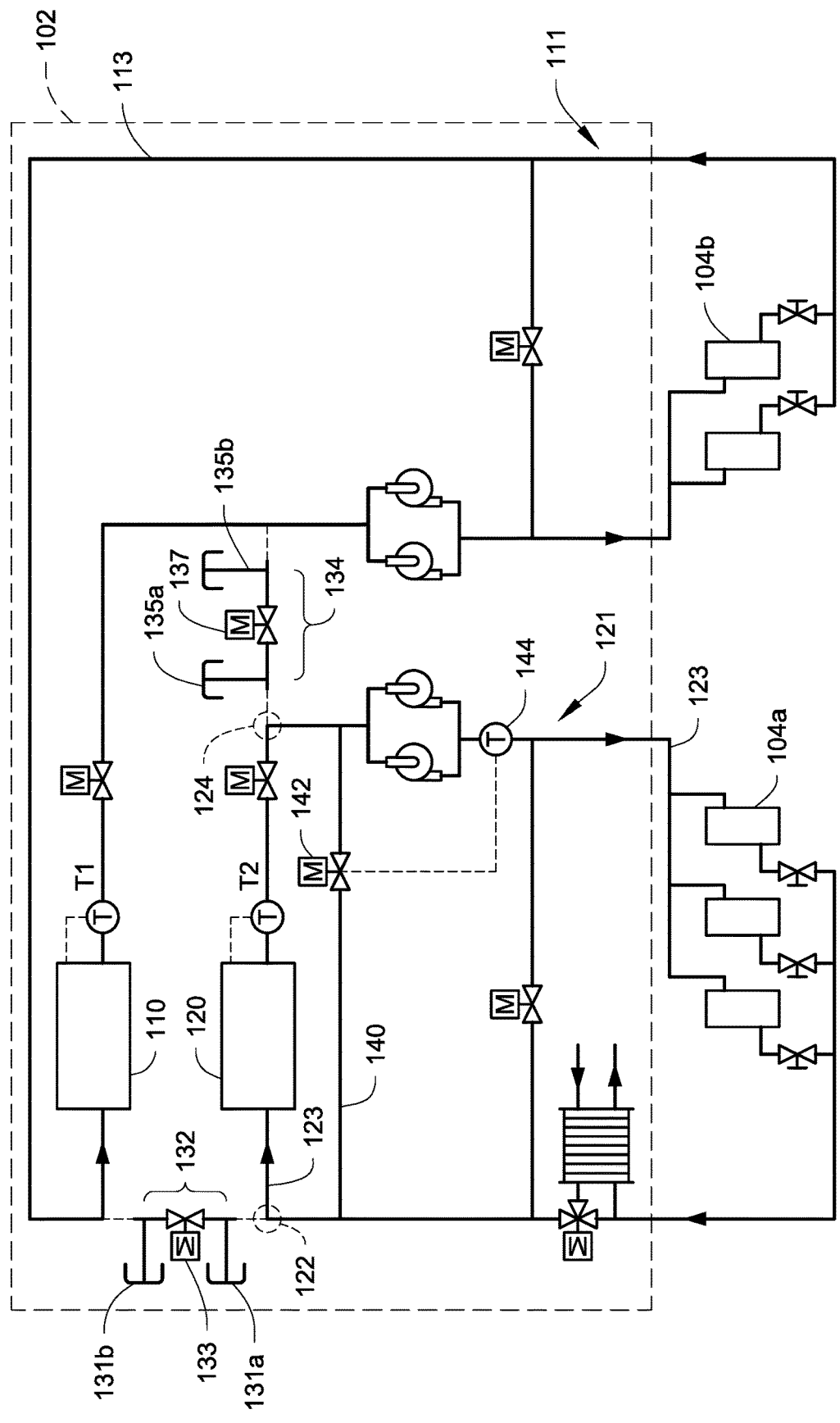
FIGS. 2A to 2C illustrate schematic diagrams of different operation modes of the chiller illustrated in FIG. 1.

In a normal operation, (e.g. as illustrated in FIG. 2A), the first chiller 110 and the second chiller 120 can operate independently (e.g. no fluid communication between the first chiller circuit 111 and the second chiller circuit 121), so that the process fluid with the first temperature T1 and the process fluid with the second temperature T2 can be provided by the corresponding chillers 110, 120. Flow control devices 133 and 137 are both closed. The process fluids with the different temperatures may be used to serve different functions. When, for example, one of the first or second chillers 110, 120 fails or is out of service (e.g. as illustrated in FIGS. 2B and 2C), fluid communication can be formed between the first chiller circuit 111 (e.g. the first process fluid circuit 113) and the second circuit 121 (e.g. the second process fluid circuit 123). The process fluid provided by one of the first or second chillers 110, 120 may be directed into both the first process fluid circuit 113 and the second process fluid circuit 123. So that the functions of both chillers 110, 120 can still be provided by the remaining operable chiller (s). The operation of the chiller plant 102 can be further understood by considering different operation modes of the chiller plant 102 as described with respect to FIGS. 2A to 2C.

Figure 2B:
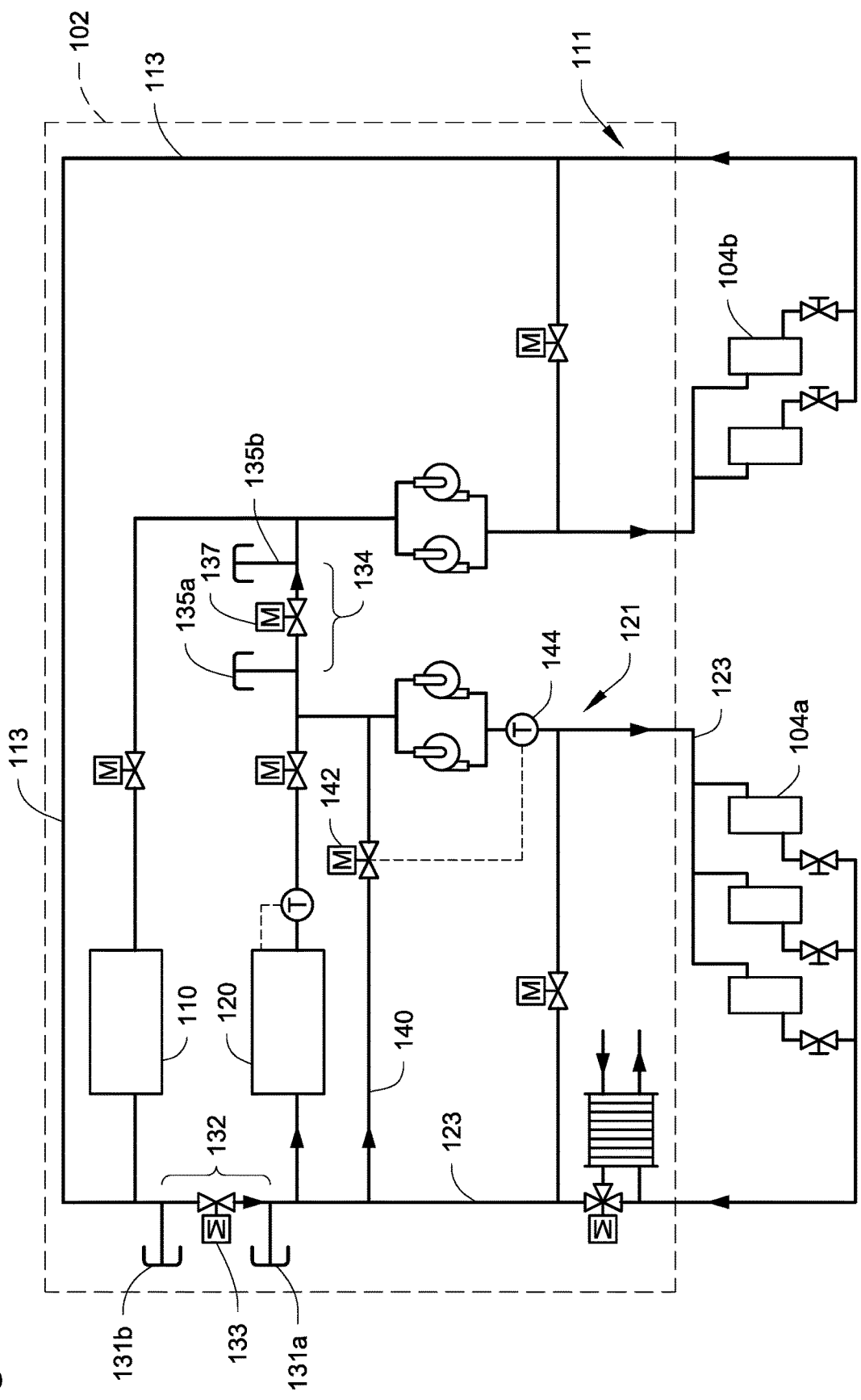
Figure 2C:
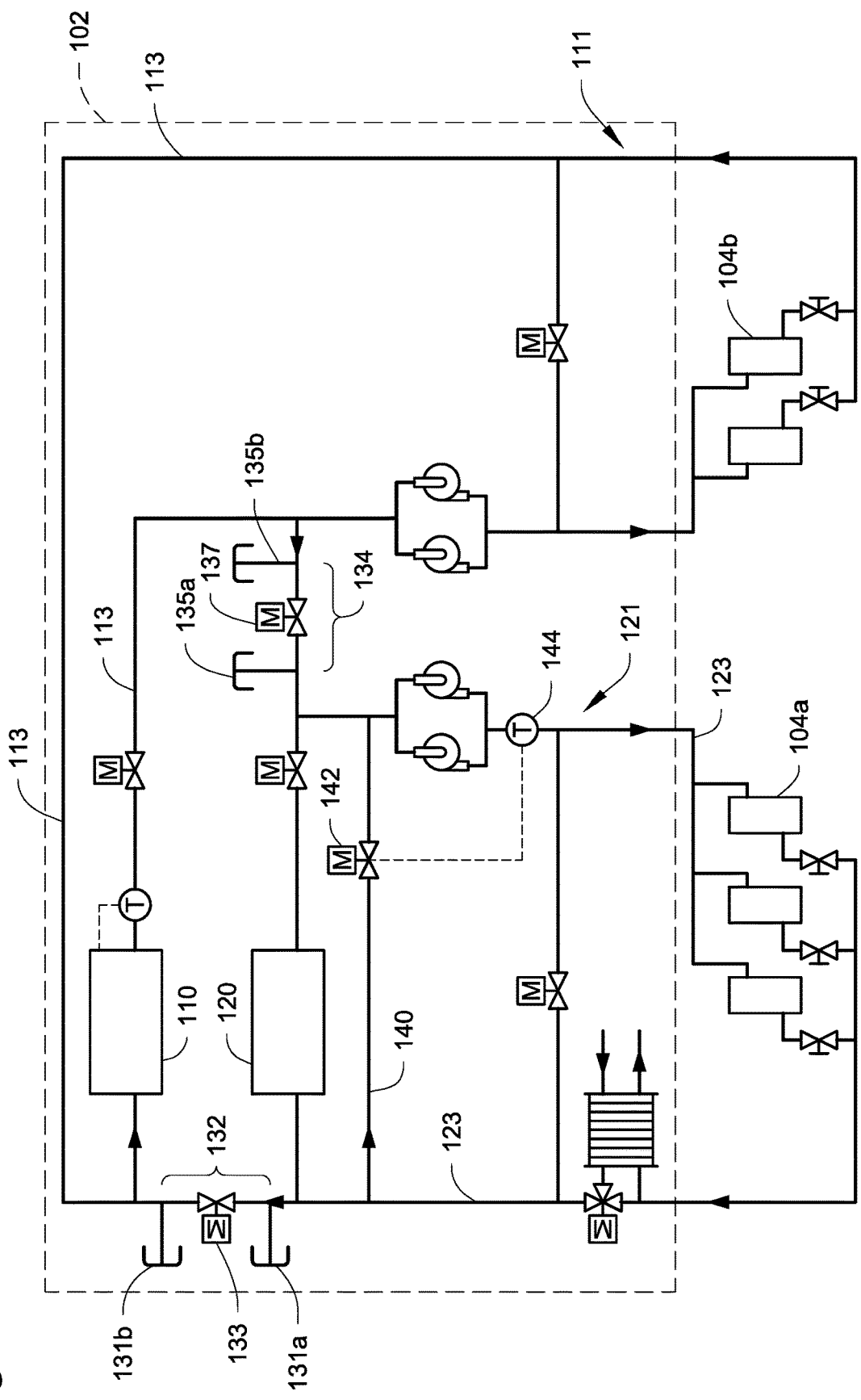

FIGS. 2A to 2C illustrate different operation modes of the chiller plant 102. In the illustrated embodiment, the first chiller 110 is configured to operate at a relatively lower temperature, such as for example at or about 40° F. (e.g. to provide a first process fluid with the temperature of 40° F. for dehumidification purposes). The second chiller 120 is configured to operate at a relatively higher temperature, such as for example at or about 57° F. (e.g. to provide a second process fluid with the temperature of 57° F. for providing sensible cooling), with the understanding that the operation temperatures of the chillers are exemplary.

In a normal operation mode as illustrated in FIG. 2A, the first chiller circuit 111 and the second circuit 121 are fluidly separate (e.g. no fluid communication between the first chiller circuit 111 and the second circuit 121). That is, the first process fluid provided by the first chiller 110 and the second process fluid provided by the second chiller 120 only circulate in their respective first chiller circuit 111 and the second chiller circuit 121 and do not mix. As illustrated, the first connecting line 132 may be in a closed state, e.g. the first flow control device 133 is in a closed state. The second connecting line 134 may be in a closed state, e.g. the second flow control device 137 is in a closed state. The fluid distribution line 140 may also be in a closed state, e.g. the flow distribution control device 142 is in a closed state.

In the normal operation mode, the first chiller 110 operates at 40° F., and the second chiller 120 operates at 57° F. The 40° F. first process fluid provided by the first chiller 110 can be directed to the AHU 104b for dehumidification. The 57° F. second process fluid provided by the second chiller circuit 121 can be directed to the VAV terminal 104a for sensible cooling.

FIGS. 2B and 2C illustrate backup operation of the chiller plant 102 when the first chiller 110 or the second chiller 120 fails or is out of service, respectively. As illustrated in FIGS. 2B and 2C, a process fluid is prevented from being directed to the failed chiller so that, for example, the failed or out of service chiller may be repaired, removed, either temporarily or permanently, or replaced.

In the backup operation as illustrated in FIGS. 2B and 2C, when one of the first chiller 110 and the second chiller 120 fails, the other chiller can be used to supplement the function (s) of the failed chiller. Generally, the remaining operable chiller operates to provide the process fluid with the lower temperature (e.g. 40° F. in FIGS. 2B and 2C). The process fluid with the lower temperature can then be directed into both the first process fluid circuit 113 and the second process fluid circuit 123.

As illustrated, the first connecting line 132 may be in an open state, e.g. the first flow control device 133 is in an open state. The second connecting line 134 may be in an open state, e.g. the second flow control device 137 is in an open state. The fluid distribution line 140 may also be in an open state, e.g. the flow distribution control device 142 is in an open state. By using the first connecting line 132 and the second connecting line 134, the first chiller circuit 111 and the second chiller circuit 121 are in fluid communication. Thus, the process fluid provided by one of the first or second chillers 110, 120, may be distributed to both the first and second chiller circuits 111, 121.

The fluid distribution line 140 may be configured to direct a suitable amount of process fluid with a relatively higher temperature to mix with the process fluid with a relative low temperature, so that the process fluid with different desired temperatures may be provided. In the illustrated embodiment, the fluid distribution line 140 allows fluid communication to be formed between the upstream side 122 and the downstream side 124 of the second chiller 120. See e.g. FIGS. 1 and 2A. The process fluid at the upstream side 122 of the second chiller 120 generally has a relatively higher temperature than the process fluid leaving either of the chillers 110, 120, because the process fluid returns from the VAV terminal 104a. It is to be understood that this embodiment is exemplary, as the fluid distribution line 140 can also be configured to direct the process fluid with a relatively higher temperature from other locations of the first and/or second chiller circuits 111, 121.

In backup operation modes, for example, the remaining operable chiller (e.g. the second chiller 120 in FIG. 2B and the first chiller 110 in FIG. 2C) is configured to provide the process fluid with the relatively low temperature of 40° F.

Referring to FIG. 2B, which illustrates the operation mode when the first chiller 110 fails or is out of service, the second chiller 120 is configured to provide the process fluid with the relatively low temperature of 40° F., instead of providing the process fluid with the relatively high temperature of 57° F. in the normal operation mode as illustrated in FIG. 2A. The 40° F. process fluid provided by the second chiller 120 can be directed into the first process fluid circuit 113 of the first chiller circuit 111 through the second connecting line 134 in the open state, and can be directed to the AHU for dehumidification. The process fluid can return to the second chiller 120 through the first connecting line 132 in the open state. In an embodiment, the valve on the leaving side of the first chiller 110 may be closed.

To help obtain the desired higher temperatures for the process fluid (e.g. 57° F. in the illustrated embodiment), at least a portion of the process fluid with a relatively high process fluid temperature (e.g. higher than the desired higher temperature of 57° F.) from a suitable portion of the first process fluid circuit 113 or the second process fluid circuit 123 may be directed to mix with a portion of the process fluid with a relatively low process fluid temperature (e.g. lower than the desired higher temperature of 57° F.), so that the process fluid with the desired higher temperature (e.g. 57° F.) can be obtained.

In the illustrated embodiment, a portion of the process fluid returning to the second chiller 120 is directed into the fluid distribution line 140. The process fluid returning to the second chiller 120 may have a relatively high temperature (e.g. higher than the process fluid temperature of 57° F. in the VAV unit 104*a*). The fluid distribution line 140 can direct the returning process fluid to mix with the 40° F. process fluid provided by the second chiller 120. An amount of the process fluid distributed into the fluid distribution line 140 can be regulated by the flow distribution control valve 142 that responds to the readings of the temperature sensor 144. The temperature sensor 144 can measure a temperature of the process fluid that is directed to the VAV unit 104*a*, which can be suitable for sensible cooling (e.g. 57° F.). When for example, the temperature of the process fluid is above 57° F., the flow distribution control valve 142 can reduce the amount of fluid flow through the fluid distribution line 140. When for example, the temperature of the process fluid is below 57° F., the flow distribution control valve 142 can increase the amount of fluid flow through the fluid distribution line 140. It will be appreciated that a controller, for example a chiller unit or HVAC system controller which may be electronic, is implemented (e.g. implemented with the temperature sensor 144) to suitably control the flow distribution control valve 142 based on the temperature measurement.

Referring to FIG. 2C, which illustrates the operation mode when the second chiller 120 fails or is out of service, the first chiller 110 is configured to provide the process fluid with the relatively low temperature of 40° F. The 40° F. process fluid provided by the first chiller 110 can be directed into the AHU 104*b* in the first chiller circuit 111 (e.g. through the first process fluid circuit 113) and return to the first chiller 110.

The process fluid in the second process fluid circuit 123, after leaving the VAV unit 104*a* can be directed back to the first chiller 110 through the first connecting line 132 in the open state. In an embodiment, the valve on the leaving side of the second chiller 120 may be closed. The fluid processed by the first chiller 110 is then controlled to exit at a desired temperature (e.g. 40° F.). A portion of the process fluid returning to the first chiller 110 from the second chiller circuit 121, which may have a relatively high temperature (e.g. higher than 57° F.), may instead be directed into the fluid distribution line 140. This portion of the process fluid may be mixed with a portion of the process fluid from the first chiller 110 (e.g. the 40° F. process fluid) to obtain a process fluid with a temperature of 57° F., which is suitable for sensible cooling. For example, in an embodiment, the first chiller 110 in FIG. 2C may provide some fluid, e.g. water, to the second chiller circuit 121 via line 134, 123 for sensible cooling.

An amount of the process fluid distributed into the fluid distribution line 140 can be regulated by the flow distribution control valve 142 in response to the temperature sensor 144. In the illustrated embodiment, the flow distribution control valve 142 can be controlled so that the temperature sensor 144 has a temperature reading of 57° F., which can be a suitable temperature of the process fluid to be directed to the VAV unit 104*a* to provide for sensible cooling. It will be appreciated that a controller, for example a chiller unit or HVAC system controller which may be electronic, is implemented (e.g. implemented with the temperature sensor 144) to suitably control the flow distribution control valve 142 based on the temperature measurement.

As illustrated in FIGS. 2B and 2C, by connecting the first chiller circuit 111 and the second chiller circuit 121 together, it is possible to provide the process fluid with two different temperatures to perform different functions. This allows the chillers to supplement each other's functions when one of the chillers may fail or is out of service.

It is to be appreciated that a process fluid from another source, such as for example a loaner chiller, may be directed into the first and/or second chiller circuit 111, 121 by using suitable stubs 131*a*, 131*b*, 135*a*, and 135*b*. The temperature of the process fluid directed through the stubs may match a temperature of the process fluid flowing in the first chiller circuit and/or second chiller circuit 111, 121 at the locations. During service, the failed or out of service chiller can be isolated (e.g. the process fluid is prevented from being directed toward the chiller). A loaner chiller, for example, can be quickly connected to the existing chiller circuit through the stubs.

The chiller plant as disclosed herein may be used with components in a HVAC system. For example, as illustrated in FIG. 1, the first and second chiller circuits 111, 121 may include one or more chiller minimum flow bypass valves, e.g. bypass 161 and 162, to enable a variable water flow rate through the chiller evaporators. Either the first chiller circuit 111, or the second chiller circuit 121, or both chiller circuits may be equipped with a chiller minimum flow bypass pipe and valve.

In another embodiment, as illustrated in FIG. 1, the chiller plant 102 may include a waterside economizer 150, which may be connected to the first chiller circuit 111, or to the second chiller circuit 121, or may be connected to both chiller circuits. While either chiller circuit could include a waterside economizer, connecting it to the second chiller circuit 121 can provide an advantage, because the process fluid returning from circuit 121 is significantly warmer than the process fluid returning from circuit 111. In one example, when the outdoor conditions allow the cooling tower to produce water at a temperature colder than the process fluid returning to the chiller, the valve at "M" of the waterside economizer 150 can be opened to direct the process fluid through the waterside economizer 150 coil for "free" cooling.

Figure 3:
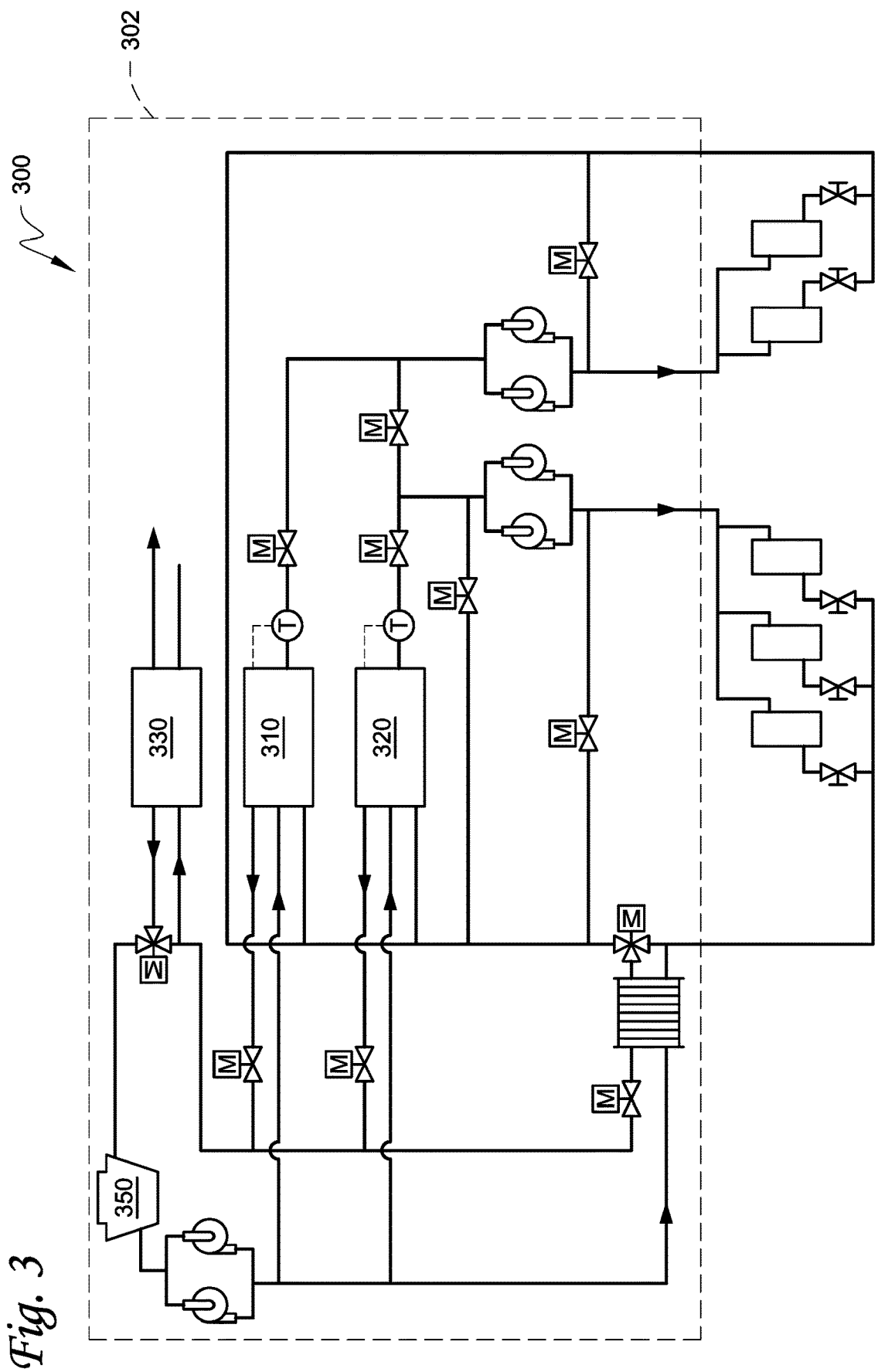
FIG. 3 illustrates a schematic diagram of another chiller plant according to another embodiment of this disclosure, where the chiller plant includes a heat recovery chiller.

In another embodiment as illustrated in FIG. 3, a HVAC system 300 may include a chiller plant 302 that is configured similarly to the chiller plant 102 as illustrated in FIG. 1. The chiller plant 302 may include an outdoor heat exchanger 350 (e.g. water tower, condenser tower) that is shared by a first chiller 310 and a second chiller 320. The outdoor heat exchanger 350 may function to reject heat from the condensers of the first chiller 310 and the second chiller 320.

In another embodiment as illustrated in FIG. 3, a HVAC system 300 may include a chiller plant 302 that is configured similarly to the chiller plant 102 as illustrated in FIG. 1. The chiller plant 302 may include a heat recovery chiller 330 that is connected to the condenser water piping of the first chiller 310 and the second chiller 320. The heat recovery chiller 330 may provide, for example, utility (or service) hot water or hot water for air stream reheat for enhanced dehumidification. The heat recovery chiller 330 may also be suitably positioned at other locations in the system.

Figure 4:
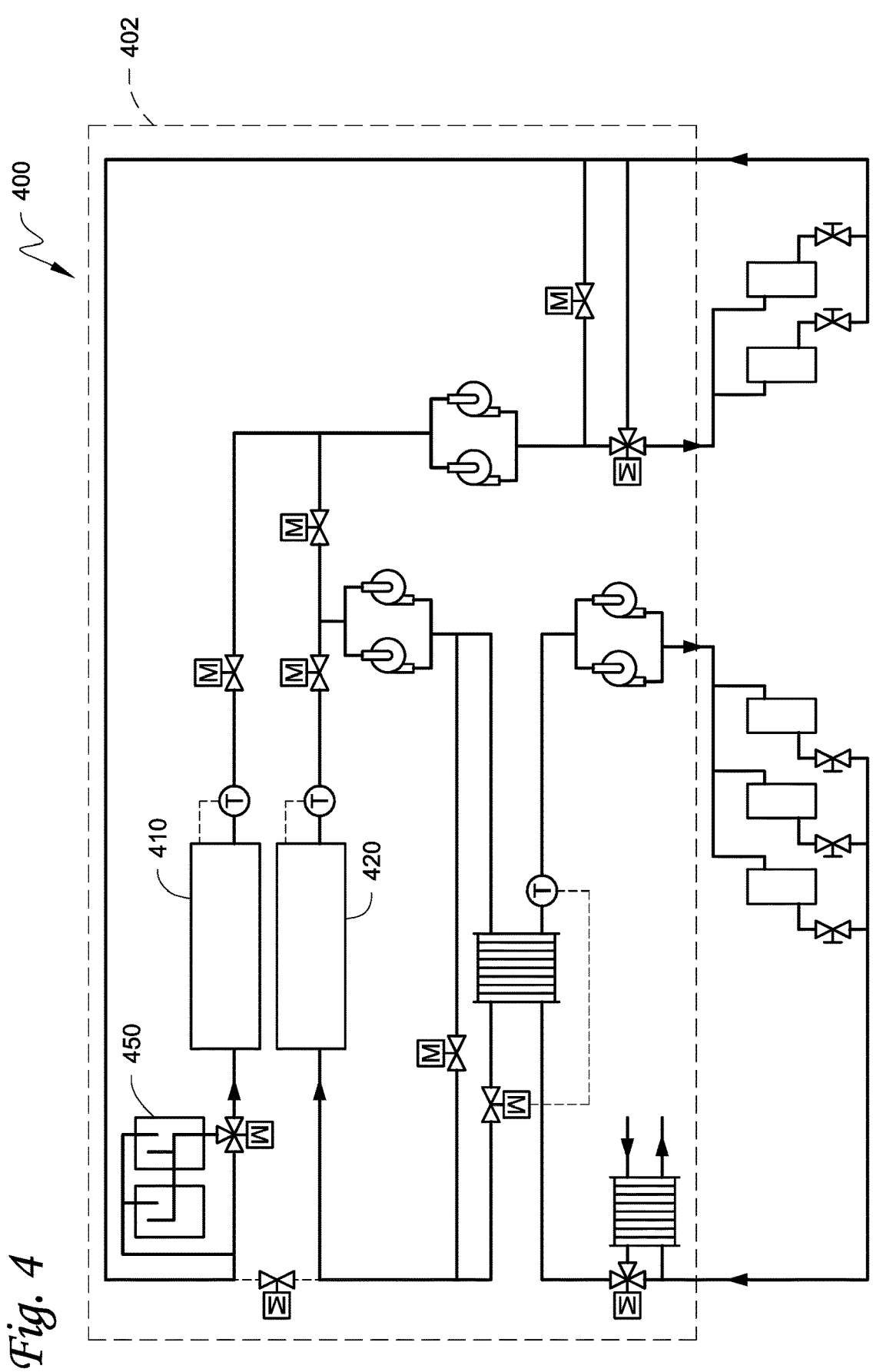
FIG. 4 illustrates a schematic diagram of yet another chiller plant according to another embodiment of this disclosure, where the chiller plant includes a thermal storage unit.

In another embodiment as shown in FIG. 4, a HVAC system 400 may include a chiller plant 402 that is configured similarly to the chiller plant 102 as illustrated in FIG. 1. The chiller plant may include a first chiller 410 that is configured to provide a process fluid with a relatively lower temperature, and a second chiller 420 that is configured to provide a process fluid with a relatively higher temperature. A thermal storage unit 450 may be connected to the first chiller 410. The first chiller 410 may charge the thermal storage unit 450, for example, during off-peak hours and/or when a cooling demand or cost of electricity is relatively low. The thermal storage unit 450 can then provide cooling during, for example, when the cooling demand or cost of electricity is relatively high.

It is to be noted that the embodiments as illustrated herein are exemplary. In some embodiments, the chiller plant may include more than two chillers.

It is to be appreciated that the temperatures in the illustrated embodiments are exemplary. In some embodiments, one of the chillers may be operated in a range of about or at 57° F. to about or at 60° F. In some situations, one of the chillers may be configured to provide a relatively cold process fluid (e.g. in a range of about or at 40° F. to about or at 45° F.

The embodiments as disclosed herein may have the advantages of: providing backup capacity in an event that one or more of the chillers may fail or be out of service, allowing for more efficient operation for example at partial load or relatively low load, and/or maximizing the benefits of other strategies such as waterside economizing, heat recovery, or thermal storage.

ASPECTS

Any of aspects 1 to 7 may be combined with aspect 8.

Aspect 1. A chiller plant, comprising:
a first chiller circuit including a first chiller and a first process fluid circuit, wherein the first chiller is configured to provide a first process fluid with a first temperature;
a second chiller circuit including a second chiller and a second process fluid circuit, wherein the second chiller is configured to provide a second process fluid with a second temperature; and
one or more connecting lines configured to allow fluid communication between the first process fluid circuit and the second process fluid circuit.

Aspect 2. The chiller plant of aspect 1, wherein the one or more connecting lines include a first connecting line configured to allow fluid communication to be formed between an upstream side of the first chiller in the first process fluid circuit and an upstream side of the second chiller in the second process fluid circuit, and a second connecting line configured to allow fluid communication to be formed between a downstream side of the first chiller in the first process fluid circuit and a downstream side of the second chiller in the second process fluid circuit.

Aspect 3. The chiller plant of aspect 2, wherein the first connecting line includes a first flow control device, and the second connecting line includes a second flow control device.

Aspect 4. The chiller plant of any one or more of aspects 1 to 3, wherein one of the first process fluid circuit and the second process fluid circuit has a distribution line configured to allow fluid communication between the upstream side and the downstream side of one of the first process fluid circuit and the second process fluid circuit.

Aspect 5. The chiller plant of aspect 4, wherein the distribution line include a flow distribution control device.

Aspect 6. The chiller plant of any one or more of aspects 1 to 5, wherein the first process fluid circuit includes an air handling unit.

Aspect 7. The chiller plant of any one or more of aspects 1 to 6, wherein the second process fluid circuit includes radiant cooling (panels or tubing embedded in a building structure), chilled beams (active or passive), and/or suitable fan powered terminals (fan-coils or variable airflow volume terminals).

Aspect 8. A method of controlling a chiller plant with a first chiller circuit operated at a relatively high temperature and a second chiller circuit operated at a relatively low temperature, wherein the first chiller circuit includes a first chiller and the second chiller circuit includes a second chiller, comprising:
when one of the first or second chiller is out of service, forming a fluid communication between the first chiller circuit and the second chiller circuit;
isolating the out of service chiller;
operating the remaining chiller at the relatively low temperature; and
directing a process fluid conditioned by the remaining chiller to the first and second chiller circuit.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

The invention claimed is:

1. A chiller plant, comprising:
a first chiller circuit including a first chiller and a first process fluid circuit, wherein the first chiller is configured to provide a first process fluid with a first temperature;
a second chiller circuit including a second chiller and a second process fluid circuit, wherein the second chiller is configured to provide a second process fluid with a second temperature, the second temperature being different than the first temperature; and
one or more connecting lines configured to selectively allow fluid communication between the first process fluid circuit and the second process fluid circuit, such that in a first state, the first chiller circuit and the second chiller circuit are fluidly separate, and in a second state, the first chiller circuit and the second chiller circuit are fluidly communicating.

2. The chiller plant of claim 1, wherein the one or more connecting lines include a first connecting line configured to allow fluid communication to be formed between an upstream side of the first chiller in the first process fluid circuit and an upstream side of the second chiller in the second process fluid circuit, and a second connecting line configured to allow fluid communication to be formed between a downstream side of the first chiller in the first process fluid circuit and a downstream side of the second chiller in the second process fluid circuit.

3. The chiller plant of claim 2, wherein the first connecting line includes a first flow control device, and the second connecting line includes a second flow control device.

4. The chiller plant of claim 3, wherein in the first state, the first flow control device is closed to prevent flow through the first connecting line and the second flow control device is closed to prevent flow through the second connecting line.

5. The chiller plant of claim 1, wherein one of the first process fluid circuit and the second process fluid circuit has a distribution line configured to allow fluid communication between the upstream side and the downstream side of one of the first process fluid circuit and the second process fluid circuit.

6. The chiller plant of claim 5, wherein the distribution line include a flow distribution control device.

7. The chiller plant of claim 1, wherein the first process fluid circuit includes an air handling unit.

8. The chiller plant of claim 1, wherein the second process fluid circuit includes radiant cooling components, chilled beams, and/or suitable fan powered terminals.

9. A method of controlling a chiller plant with a first chiller circuit operated at a relatively high temperature and a second chiller circuit operated at a relatively low temperature, wherein the first chiller circuit includes a first chiller and the second chiller circuit includes a second chiller, comprising:
- when one of the first or second chiller is out of service, forming a fluid communication between the first chiller circuit and the second chiller circuit;
- isolating the out of service chiller;
- operating the remaining chiller at the relatively low temperature; and
- directing a process fluid conditioned by the remaining chiller to the first and second chiller circuit.

\* \* \* \* \*